United States Patent
Walz et al.

(10) Patent No.: US 8,020,374 B2
(45) Date of Patent: Sep. 20, 2011

(54) METHOD FOR OPERATING AN INTERNAL COMBUSTION ENGINE AND DEVICE FOR IMPLEMENTING THE METHOD

(75) Inventors: Christian Walz, Durmersheim (DE); Matthias Loehr, Steinheim/Hoepfigheim (DE); Andreas Rudolph, Roggenburg (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 12/066,231

(22) PCT Filed: Aug. 1, 2006

(86) PCT No.: PCT/EP2006/064904
§ 371 (c)(1),
(2), (4) Date: Oct. 8, 2008

(87) PCT Pub. No.: WO2007/028681
PCT Pub. Date: Mar. 15, 2007

(65) Prior Publication Data
US 2009/0199542 A1     Aug. 13, 2009

(30) Foreign Application Priority Data
Sep. 7, 2005  (DE) .......................... 10 2005 042 488

(51) Int. Cl.
*F01N 3/00*     (2006.01)
(52) U.S. Cl. ................ 60/286; 60/274; 60/276; 60/297; 60/301; 60/303
(58) Field of Classification Search .................... 60/274, 60/276, 286, 297, 299, 301
See application file for complete search history.

(56) References Cited

U.S. PATENT DOCUMENTS

| | | | | |
|---|---|---|---|---|
| 6,119,448 A | * | 9/2000 | Emmerling et al. | 60/274 |
| 6,389,802 B1 | * | 5/2002 | Berger et al. | 60/274 |
| 6,438,947 B2 | * | 8/2002 | Ludwig et al. | 60/285 |
| 6,460,329 B2 | * | 10/2002 | Shimotani et al. | 60/285 |
| 6,705,078 B2 | * | 3/2004 | Hahn et al. | 60/285 |
| 6,990,799 B2 | * | 1/2006 | Bidner et al. | 60/277 |
| 7,543,443 B2 | * | 6/2009 | Tsumagari | 60/277 |

FOREIGN PATENT DOCUMENTS

| | | |
|---|---|---|
| DE | 199 03 439 | 8/2000 |
| DE | 199 60 731 | 6/2001 |
| DE | 199 62 912 | 7/2001 |
| DE | 103 49 126 | 6/2004 |
| DE | 103 01 606 | 7/2004 |
| DE | 10 2004 031 624 | 2/2006 |
| DE | 10 2004 046 640 | 3/2006 |
| GB | 2 403 165 | 12/2004 |

\* cited by examiner

*Primary Examiner* — Binh Q Tran
(74) *Attorney, Agent, or Firm* — Merchant & Gould P.C.

(57) ABSTRACT invention relates to a method for operating an internal combustion engine, in the exhaust gas section of which is arranged at least one SCR catalytic converter, which is hit with a reagent that contributes to $NO_x$ conversion in the SCR catalytic converter, and to a device for implementing the method. At least one measure is calculated for the $NO_x$ concentration downstream after the SCR catalytic converter. An $NO_x$ sensor, which is arranged downstream after the SCR catalytic converter, generates an exhaust gas sensor signal which corresponds to at least the $NO_x$ concentration and optionally, as a result of cross sensitivity, to a reagent slip. A reagent signal, which determines the dosage of reagent, is influenced by a correction signal as a function of the difference and as a function of a measure for the temperature of the SCR catalytic converter.

12 Claims, 1 Drawing Sheet

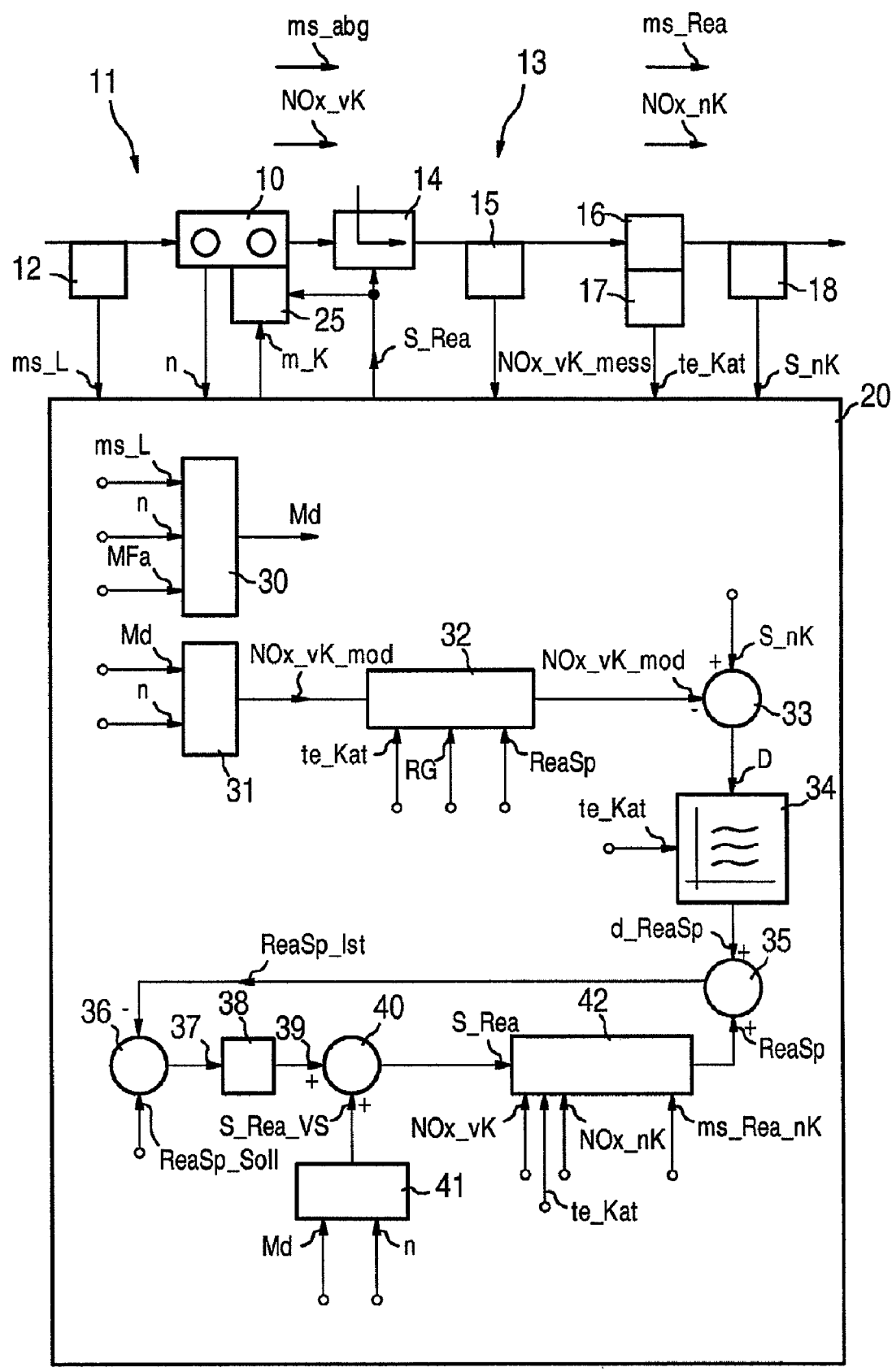

METHOD FOR OPERATING AN INTERNAL COMBUSTION ENGINE AND DEVICE FOR IMPLEMENTING THE METHOD

TECHNICAL FIELD

The invention proceeds from a procedure to operate an internal combustion engine, in whose exhaust gas section, a $NO_x$ sensor is disposed downstream after the SCR catalytic converter; and from a device to implement the procedure according to the class of the independent claims.

BACKGROUND

In the German patent DE 199 03 439 A1 a procedure and a device to operate an internal combustion engine are described, in whose exhaust gas section a SCR catalytic converter (Selective Catalytic Reduction) is disposed, which reduces the nitrogen oxides contained in the exhaust gas of the internal combustion engine to nitrogen using a reagent substance. The metering of the reagent substance is carried out preferably as a function of the operating parameters of the internal combustion engine, such as, for example, the engine rotational speed and the amount of fuel injected. Furthermore, the metering is carried out preferably as a function of the exhaust gas parameters, such as, for example, the exhaust gas temperature or the operating temperature of the SCR catalytic converter.

Provision is made, for example, for ammonia to be the reducing agent, which is derived from a urea water solution. The dosage of the reagent substance or of the source materials of the reagent substance must be carefully established. A dosage which is too small has the consequence that the nitrogen oxides in the SCR catalytic converter can no longer be completely reduced. Too large of a dosage leads to a slip of the reagent substance, which on the one hand can lead to an unnecessarily large consumption of the reagent substance, and on the other hand as a function of the composition of the reagent substance can lead to an unpleasant odor.

In the German patents DE 199 60 731 A1 and DE 199 62 912 A1, $NO_x$ sensors are described in each case, in which provision is made for the acquisition of the $NO_x$ concentration present in an exhaust gas flow. The $NO_x$ sensors contain multiple chambers, which are connected to each other via diffusion barriers. The known multiple chamber $NO_x$ sensors have as a result of the measuring principle a cross sensitivity with regard to ammonia (NH3). For example as a reagent substance, the ammonia contained in the exhaust gas leads to a falsification of the sensor signal by way of the reactions 4 NHS+5O2→4NO+6H2O. If an increase of the reagent substance dosage thus occurs during the previously known procedural approaches, the sensor signal will increase when an excess dosage or a correct dosage of the reagent substance exists due to the reagent substance slip which arises; and when an underdosage of the reagent substance exists due to the increasing $NO_x$ conversion, the sensor signal will drop out. If on the other hand the reagent substance dosage is lowered, the sensor signal will drop out if an excess dosage of the reagent substance exists due to the decreased reagent substance slip; and the sensor signal will increase when a correct dosage or an underdosage of the reagent substance exists due to the $NO_x$ conversion, which is no longer complete.

In the German patent DE 10 2004 046 640 A1, a procedure to operate an internal combustion engine and a device to implement the procedure are described, in which a $NO_x$ sensor with a cross sensitivity with regard to a reagent substance is disposed downstream after the SCR catalytic converter. At least one SCR catalytic converter, which is impinged with a reagent substance, is disposed in the exhaust gas section. The reagent substance contributes to the $NO_x$ conversion in the SCR catalytic converter. Provision is made for the calculation of at least one measurement for the $NO_x$ concentration arising downstream after the SCR catalytic converter. This calculation makes an increase in accuracy when establishing a dosage of the reagent substance possible.

A reagent substance slip can be ascertained from the difference between the calculated measurement for the $NO_x$ concentration and the measured quantity for the sum of the $NO_x$ concentration and the reagent substance concentration. The fact is taken into account that a reagent substance slip as well as an insufficient $NO_x$ reducing reaction causes a deviation in the same direction between the calculated measurement for the $NO_x$ concentration and the measured quantity for the sum of the $NO_x$ concentration and the reagent substance concentration. According to one embodiment the dosage of the reagent substance is initially reduced when a difference as mentioned above occurs. If a reagent substance slip were present, the reduction of the dosage of the reagent substance would lead to a reduction of the reagent substance slip. The reduction of the dosage of the reagent substance proved in this case to be the correct step. If too small a dosage of the reagent substance were originally present, the difference ascertained would continue to increase due to a small $NO_x$ conversion, so that it could be suggested from this, that the reduction of the reagent substance was false and an increase of the dosage is to be conducted instead.

In the German patent DE 10 2004 031 624 A1, a procedure is described to operate a SCR catalytic converter used to purify the exhaust gas of an internal combustion engine, in which provision is made for an open-loop or closed-loop adjustment of the reagent substance fill level in the SCR catalytic converter to a specified storage set point. The targeted specification of the storage set point secures on the one hand that during transient states of the internal combustion engine, a sufficient amount of the reagent substance is available to remove the $NO_x$ emissions of the internal combustion engine before the SCR catalytic converter as completely as possible; and that on the other hand, a reagent substance slip is avoided.

The reagent substance fill level of the SCR catalytic converter is ascertained using a catalytic converter model, which takes into account the $NO_x$ mass flow entering into the SCR catalytic converter, the $NO_x$ mass flow departing the SCR catalytic converter, the temperature of the catalytic converter as well as if need be the reagent substance slip. The maximum possible reagent substance fill level of the SCR catalytic converter depends especially on the operating temperature of the SCR catalytic converter, which is the highest at low operating temperatures and drops off to lower values with an increasing operating temperature. The efficiency of the SCR catalytic converter depends on the catalytic activity; which is small at low operating temperatures, passes through a maximum with a rising operating temperature and drops off again when the operating temperature continues to rise.

The task underlying the invention is to indicate a procedure to operate an internal combustion engine, in whose exhaust gas section a SCR catalytic converter and a $NO_x$ sensor located downstream after the SCR catalytic converter are disposed, as well as a device to implement the procedure, which allows for the most optimal as possible result for the purification of the exhaust gas simultaneously with a minimal reagent substance slip.

The task is solved in each case by the characteristics indicated in the independent claims.

SUMMARY OF THE INVENTION

The procedure according to the invention to operate an internal combustion engine assumes that at least one SCR catalytic converter is disposed in the exhaust section of the internal combustion engine. The SCR catalytic converter is impinged with a reagent substance, which contributes to the $NO_x$ conversion in the SCR catalytic converter. Downstream after the catalytic converter, a $NO_x$ catalytic converter is disposed, which provides a sensor signal, which reflects at least a measurement for the $NO_x$ concentration in the exhaust gas downstream after the catalytic converter. At least one measurement is additionally calculated for the $NO_x$ concentration arising downstream after the SCR catalytic converter. The difference is ascertained between the calculated measurement for the $NO_x$ concentration and the measured $NO_x$ concentration. A reagent substance signal, which establishes the dosage of the reagent substance, is not only affected by a correction signal as a function of the ascertained difference, but additionally as a function of a measurement for the temperature of the SCR catalytic converter.

When establishing the dosage of the reagent substance, the procedural approach according to the invention takes into account the temperature of the SCR catalytic converter, which has an affect on the storage capability of the reagent substance in the SCR catalytic converter. A change of the reagent substance signal, which is required if necessary, is thereby adapted to the temperature dependent storage capability of the reagent substance in the catalytic converter. With this step, an excess dosage of the reagent substance, which arises contingent on a change of the reagent substance and would lead to an increased reagent substance slip, as well as an underdosage of the reagent substance, which would lead to and increased $NO_x$ impact on the environment, is avoided in each case.

The procedural approach according to the invention can be implemented with simple and cost effective means so that merely a $NO_x$ sensor disposed downstream after the SCR catalytic converter is required, which if need be has an inherently undesirable cross sensitivity with regard to the reagent substance. This cross sensitivity is specifically utilized within the scope of an embodiment of the procedural approach according to the invention.

Advantageous modifications and embodiments of the procedural approach according to the invention result from the dependent claims.

Provision is made in one embodiment for the correction signals to be deposited as a function of the difference and of the measurement for the temperature of the SCR catalytic converter in a characteristic diagram, which supplies a selected correction signal.

Provision is made in one embodiment for the reagent substance signal to be established as a function of the reagent substance fill level in the SCR catalytic converter. Provision is made in a modification of this embodiment for the reagent substance signal to be indirectly affected by way of a manipulation of the reagent substance fill level in the SCR catalytic converter. Preferably the reagent substance fill level in the SCR catalytic converter is regulated in a closed-loop to a specified reagent substance set point fill stand.

Provision is made in one embodiment for the temperature of the SCR catalytic converter and the reagent substance fill level in the SCR catalytic converter and/or the space velocity of the exhaust gas in the SCR catalytic converter to be taken into account along with the $NO_x$ emissions before the SCR catalytic converter when calculating the $NO_x$ concentration arising downstream after the SCR catalytic converter. In so doing, a high degree of accuracy is achieved.

Provision is made in an additional embodiment for the specified reagent substance set point fill level to be established at least at a maximum value, which corresponds to an SCR catalytic converter completely filled with the reagent substance. This embodiment has advantages in connection with an additional embodiment, in which provision is made for the $NO_x$ sensor to have a cross sensitivity with regard to the reagent substance. The cross sensitivity can thereby specifically be taken advantage of; in that when a difference occurs, initially a manipulation of the reagent substance signal is continuously conducted for the purpose of reducing the dosage of the reagent substance. This takes place because the difference reflects a reagent substance slip with a high degree of probability.

The device according to the invention to operate an internal combustion engine concerns initially a control unit, which is designed to implement the procedure. The control unit especially contains a difference ascertainment, which ascertains the difference between the exhaust gas sensor signal provided by the $NO_x$ sensor and the $NO_x$ concentration downstream after the SCR catalytic converter, which is calculated by a $NO_x$ concentration ascertainment. Provision is additionally made for the control unit to contain a characteristic diagram, which provides a correction signal for the manipulation of the reagent substance signal and in which the correction signals are deposited at least as a function of the difference and as a function of the measurement for the temperature of the SCR catalytic converter.

The control unit preferably contains an electrical storage memory, in which the procedural steps are filed as a computer program.

Additional advantageous modifications and embodiments of the procedural approach according to the invention result from additional dependent claims and from the following description.

BRIEF DESCRIPTION OF THE DRAWING

The FIGURE shows a technical environment, in which the procedure according to the invention is operating.

DETAILED DESCRIPTION

The FIGURE shows an internal combustion engine 10, in whose air intake section 11, an air ascertainment 12 is disposed; and in whose exhaust gas section 13, a reagent substance metering 14, a first $NO_x$ sensor 15, an SCR catalytic converter 16, a temperature sensor 17 assigned to the SCR catalytic converter 16 as well as a second $NO_x$ sensor 18 are disposed.

An exhaust gas flow ms_abg as well as an untreated $NO_x$ concentration $NO_x$_vK arises downstream after the internal combustion engine 10. A $NO_x$ concentration $NO_x$_nK as well as a reagent substance slip ms_Rea_nK arises downstream after the SCR catalytic converter 16.

The air ascertainment 12 provides an air signal ms_L to a control unit 20; the internal combustion engine 10 provides an engine rotational speed signal n; the first $NO_x$ sensor 15 provides a first $NO_x$ signal $NO_x$_vK_mess; the temperature sensor 17 provides a measurement for the temperature te_Kat of the SCR catalytic converter 16; and the second $NO_x$ sensor 18 makes an exhaust gas sensor signal S_nK available to the control unit 20.

The control unit 20 provides a fuel signal m_K to a fuel metering device 25 assigned to the internal combustion engine 10 as well as a reagent substance signal S_Rea to the reagent substance metering 14 and to the fuel metering device 25.

The control unit 20 contains a torque ascertainment 30, which is provided with the air signal ms_L, the engine rotational speed signal n as well as a torque set point MFa and which ascertains a torque Md of the internal combustion engine 10.

The control unit 20 additionally contains an untreated $NO_x$ concentration ascertainment 31, which is provided with the air signal ms_L, the engine rotational speed signal n as well as the fuel signal m_K and which ascertains a calculated measurement $NO_x\_vK\_mod$ of the untreated $NO_x$ concentration before the SCR catalytic converter $NO_x\_vK$.

The control unit 20 further contains a $NO_x$ concentration ascertainment 32, which is provided with the calculated measurement $NO_x\_vK\_mod$ for the untreated $NO_x$ concentration before the SCR catalytic converter $NO_x\_vK$, the measurement for the temperature te_Kat of the SCR catalytic converter 16, a space velocity RG as well as a reagent substance fill level ReaSp in the SCR catalytic converter 16, and which ascertains a calculated measurement $NO_x\_nK\_mod$ for the $NO_x$ concentration $NO_x\_nK$ downstream after the SCR catalytic converter 16.

The calculated measurement $NO_x\_nK\_mod$ for the $NO_x$ concentration $NO_x\_NK$ and the exhaust gas sensor signal S_nK are provided to a first difference ascertainment 33, which ascertains a difference D. The difference D as well as the measurement for the temperature te_Kat is provided to a characteristic diagram 34, which provides a correction signal d_ReaSp, which is supplied to a first summing amplifier 35.

The first summing amplifier 35 ascertains a reagent substance actual fill level ReaSp_Ist from the correction signal d_ReaSp and the reagent substance fill level ReaSp. The reagent substance actual fill level ReaSp_Ist is provided to a second difference ascertainment 36, which ascertains a control deviation 37 from the reagent substance actual fill level ReaSp_Ist and a reagent substance set point fill level ReaSp_Soll. A closed-loop controller 38 ascertains a regulating variable 39 from the control deviation 37. This regulating variable 39 is provided to a second summing amplifier 40, which adds a reagent substance pilot variable S_Rea_VS to the regulating variable 39 and which provides a reagent substance signal S_Rea.

The reagent substance pilot variable S_Rea_VS is provided by a pilot value ascertainment 41, which ascertains the reagent substance pilot variable S_Rea_VS from the torque Md and the engine rotational speed signal n.

The reagent substance signal S_Rea is provided to a catalytic converter model 42, which continues to obtain the untreated $NO_x$, concentration before the SCR catalytic converter $NO_x\_vK$, the $NO_x$ concentration after the SCR catalytic converter $NO_x\_nK$, the measurement for the temperature te_Kat of the SCR catalytic converter 16 and the reagent substance slip ms_Rea_nK. The catalytic converter model 42 supplies the reagent substance fill level ReaSp.

The procedure according to the invention works as follows:

The torque ascertainment 30 disposed in the control unit 20 ascertains the torque Md generated by the internal combustion engine 10 as a function of at least the specified torque set point MFa, which, for example, is provided by an unspecified accelerator pedal of a motor vehicle, in which the internal combustion engine 10 is disposed as the power source. The torque Md is at least approximately a measurement for the load of the internal combustion engine 10. When ascertaining the torque Md, the engine rotational speed signal n and/or the air signal ms_L supplied by the air acquisition 12 can continue to be taken into account.

The control unit 20 transmits the fuel signal m_K, which is established especially on the basis of the torque, to the fuel metering device 25. The fuel signal m_K establishes, for example, a fuel point of injection as well as an injected quantity of fuel.

The fuel combusted in the internal combustion engine 10 leads to the exhaust gas flow ms_abg, which can contain the undesirable, more or less large, untreated $NO_x$ concentrations before the SCR catalytic converter $NO_x\_vK$ as a function of the operating point of the internal combustion engine 10.

At least the SCR catalytic converter 16 is disposed in the exhaust gas section 13 of the internal combustion engine 10 for the most extensive as possible removal of the untreated $NO_x$ concentration before the SCR catalytic converter $NO_x\_vK$. Beside the SCR catalytic converter 16, provision can be made for additional catalytic converters and/or a particle filter. The SCR catalytic converter 16 supports the reducing reaction of the $NO_x$ with a reagent substance, which is either metered into the exhaust gas section 13 with the reagent substance metering 14 and/or if need be is supplied within the motor. Provision can be made for a source material instead of the reagent substance. In the case of the reagent substance ammonia, provision can be made, for example, for a urea-water solution or, for example, for ammonium carbamate to be the source material. The dosage is established with the reagent substance signal S_Rea, which is provided to the reagent substance metering 14. Alternatively or additionally, when the reagent substance is supplied by the engine internally, the fuel signal m_K can be modified by the reagent substance signal S_Rea in such a way that the required amount of reagent substance is generated internally.

After starting the procedure according to the invention, the establishment of the reagent substance set point fill level ReaSp_Soll occurs at the specified reagent substance fill level ReaSp_Soll, which, for example, can be established at a value, which lies under the maximum possible reagent substance fill level in the SCR catalytic converter 16 if a reagent substance slip ms_Rea_nK is to be avoided if possible in all operating states. Provision is made in contrast in an advantageous embodiment for the specified reagent substance set point fill level ReaSp_Soll to correspond to the maximum possible reagent substance fill level in the SCR catalytic converter 16, which is dependent on the temperature te_Kat in the SCR catalytic converter 16. The correlation is described in detail in the German patent DE 10 2004 031 624 A1 mentioned at the beginning of the application, which is hereby referred to in its entirety.

The establishment of the reagent substance set point fill level ReaSp_Soll can also be accomplished at a value higher than the maximum value, so that in this case a reagent substance slip ms_Rea_nK, which at least is very small, has to always be anticipated. The important advantage of establishing the reagent substance set point fill level ReaSp_Soll at least the maximum value or at a higher value, which can only exist as an operand, lies with the fact that the SCR catalytic converter 16 is constantly operated in the range of its maximum efficiency, at which the highest possible $NO_x$ conversion takes place. In all of the operating states of the internal combustion engine 10 as well as the SCR catalytic converter 16 and within all of the parameters of the exhaust gas in the exhaust gas section 13, assurance is made for the $NO_x$ concentration after the SCR catalytic converter $NO_x\_nK$ to have the minimum possible value. A reagent substance slip ms_Rea_nK occurring at least occasionally must be taken for granted. Provided the reagent substance set point fill level ReaSp_Soll is established at a value higher than the maximum value, a small reagent substance slip ms_Rea_nK always occurs.

The reagent substance fill level ReaSp in the SCR catalytic converter 16 can be set by an open loop control to a specified reagent substance set point fill level ReaSp_Soll. Provision is preferably made for a closed-loop controlled setting to the specified reagent substance set point fill level ReaSp_Soll. In the second difference ascertainment 36, the reagent substance set point fill level ReaSp_Soll is compared with the reagent substance actual fill level ReaSp_Ist. The second difference ascertainment 36 develops a difference, which is fed to the closed-loop controller 38 as a control deviation 37. The closed-loop controller 38 then ascertains the regulating variable 39. The regulating variable 39 is added to the preferably already existing reagent substance pilot variable S_Rea_VS in the second summing amplifier 40.

The reagent substance pilot variable S_Rea_VS can specify, for example, a base amount of the reagent substance to be metered as a function of the operating parameters of the internal combustion engine 10. In the pilot variable ascertainment 41, the torque Md as well as the engine rotational speed signal n is, for example, taken into account. This procedural approach allows for a comparatively easy application.

The regulating variable 39, which if necessary is combined with the existing reagent substance pilot variable S_Rea_VS, establishes the reagent substance signal S_Rea, which is fed to the reagent substance metering 15 and/or the fuel metering device 25. The reagent substance signal S_Rea enables, for example, a cross section of a valve to open, which corresponds to a specified reagent substance flow, which additionally depends on the reagent substance pressure.

The catalytic converter model 42 ascertains the reagent substance fill level ReaSp using the reagent substance signal S_Rea while taking into account the untreated $NO_x$ concentration before the SCR catalytic converter $NO_x\_vK$, the $NO_x$ concentration after the SCR catalytic converter $NO_x\_nK$ as well as the measurement for the temperature te_Kat of the SCR catalytic converter 16. The reagent substance slip ms_Rea_nK is if need be additionally taken into account. The catalytic converter model 42 is described in the aforementioned State of the Art, to which reference is again made at this point.

Provision is made to ascertain the calculated measurement $NO_x\_nK\_mod$ for the $NO_x$ concentration after the SCR catalytic converter $NO_x\_nK$. The calculation takes place in the $NO_x$ concentration ascertainment 32 on the basis of the calculated measurement $NO_x\_vK\_mod$ for the untreated $NO_x$ concentration before the SCR catalytic converter $NO_x\_vK$, which the untreated $NO_x$ concentration ascertainment 31 supplies on the basis of, for example, the torque Md and/or the engine rotational speed signal n. The $NO_x$ concentration ascertainment 32 ascertains a degree of efficiency for the SCR catalytic converter 16 using the measurement for the temperature te_Kat, which the temperature sensor 17 provides. The temperature sensor 17 can be disposed before, in or downstream after the SCR catalytic converter 16, so that the sensor signal supplied by the temperature sensor 17 is at least approximately a measurement for the temperature te_Kat of the SCR catalytic converter 16. Provision can also be made for an estimate of the temperature te_Kat of the SCR catalytic converter 16 instead of a temperature measurement.

Preferably the exhaust gas space velocity RG is additionally taken into account in the $NO_x$ concentration ascertainment 32. The exhaust gas space velocity RG can be ascertained from the known geometric data of the SCR catalytic converter 16 and from the exhaust gas flow ms_abg. Additionally, the reagent substance fill level ReaSp in the SCR catalytic converter 16 is taken into account because the degree of efficiency also especially depends on the reagent substance fill level ReaSp.

The measurement $NO_x\_nK\_mod$ calculated by the $NO_x$ concentration ascertainment 32 for the $NO_x$ concentration after the SCR catalytic converter $NO_x\_nK$ is subtracted from the exhaust gas sensor signal S_nK in order to obtain the difference D. A difference D, which occurs, can be taken into account in the metering strategy, and the reagent substance signal S_Rea can be manipulated accordingly.

When the correction signal d_ReaSp is being supplied, the measurement for the temperature te_Kat of the SCR catalytic converter is furthermore taken into account along with the difference D. The required correction signals d_ReaSp are deposited in the characteristic diagram 34 at least as a function of the difference D and as a function of the measurement for the temperature te_Kat of the SCR catalytic converter 16. The characteristic diagram 34 is addressed as a function at least of both parameters and emits the correction signal d_ReaSp corresponding to the deposited value. Within the scope of the patent application, the characteristic diagram 34 is provided with at least pairs of variates; whereby when the difference D is constant at higher temperatures te_Kat, the dosage of the reagent substance is to be reduced by a slight degree lower than the dosage at lower temperatures te_Kat. Correspondingly when the difference D is constant at higher temperatures te_Kat, the reagent substance fill level ReaSp is to be increased by a slight degree than is the case at lower temperatures.

The correction signal d_ReaSp could immediately be pulled up to influence the reagent substance signal S_Rea. In the example of embodiment depicted, the reagent substance signal S_Rea is indirectly affected by an intervention into the reagent substance fill level ReaSp, whereby the correction signal d_ReaSp manipulates the reagent substance actual fill level ReaSp_Ist in the SCR catalytic converter 16. The reagent substance fill level ReaSp calculated from the catalytic converter model 42 is acted upon by the correction signal d_ReaSp, so that the reagent substance actual fill level ReaSp is modified. Provided that a difference D corresponding to a reagent substance slip ms_Rea_nK occurs, an increase in the reagent substance actual fill level ReaSp_Ist, for example, results, which due to the closed-loop control consequently elicits a degradation of the reagent substance signal S_Rea.

It is possible in principle to acquire the $NO_x$ concentration $NO_x\_nK$ after the SCR catalytic converter with a $NO_x$ sensor and to acquire the reagent substance slip ms_Rea_nk with a reagent substance sensor. The utilization of an existing cross sensibility of the second $NO_x$ sensor 18 with regard to the reagent substance is, however, particularly advantageous or a targeted development of such a cross sensibility. In this case, the exhaust gas sensor signal S_nK reflects the sum of the reagent substance slip ms_Rea_nK and the $NO_x$ concentration after the SCR catalytic converter $NO_x\_nk$. A difference D, which occurs, could mean for that reason that either a reagent substance slip ms_Rea_nK or a high $NO_x$ concentration after the SCR catalytic converter $NO_x\_nK$ has occurred. Discrimination between the two would not be possible in this operating state. If according to the advantageous embodiment the reagent substance set point fill level ReaSp_Soll in the SCR catalytic converter 16 is established to the maximum possible value, it can thereby be assumed that an overdosage of the reagent substance exists, which corresponds to a reagent substance slip ms_Rea_nK. Provision is made for the closed-loop control in the example of embodiment depicted, so that the reagent substance slip ms_Rea_nK either only occurs for a short time or in the case of a continuous overdosing of the reagent substance is limited to a small amount.

The invention claimed is:

1. A method of operating an internal combustion engine having an exhaust gas section with at least one SCR catalytic converter whose NOx conversion efficiency is regulated with a reagent substance, the method comprising:
    calculating a first NOx concentration occurring downstream from a SCR catalytic converter;
    measuring a second NOx concentration occurring downstream from the SCR catalytic converter with a NOx sensor;
    determining a difference between the first NOx concentration and the second NOx concentration;
    measuring a temperature in the SCR catalytic converter;
    calculating a correction signal;
    calculating a reagent substance signal to regulate a reagent substance dosage,
    wherein the reagent substance dosage signal is a function of the correction signal.

2. The method of claim 1 further comprising calculating a first correction signals, wherein the correction signal is calculated in a characteristic diagram as a function of the temperature in the SCR catalytic converter and the difference between the first NOx concentration and the second NOx concentration.

3. The method of claim 1 further comprising establishing the reagent substance signal as a function of a reagent substance fill level in the SCR catalytic converter.

4. A method according to claim 3, wherein the reagent substance signal is indirectly affected by way of a manipulation of the reagent substance fill level in the SCR catalytic converter.

5. A method according to claim 3, comprising adjusting an actual reagent substance fill level in the SCR catalytic converter in a closed-loop feedback configuration to a specified reagent substance set point fill level.

6. The method of claim 1, wherein the calculation of the first NOx occurring downstream from a SCR catalytic converter is a function of at least a untreated NOx concentration before the SCR catalytic converter, the temperature of the SCR catalytic converter, the reagent substance fill level in the SCR catalytic converter, and/or a space velocity of the exhaust gas in the SCR catalytic converter.

7. A method according to claim 5, wherein the specified reagent substance set point fill level is established at least at a maximum value, which corresponds to a SCR catalytic converter completely filled with the reagent substance.

8. A method according to claim 1, wherein the $NO_x$ sensor has a cross sensitivity with regard to the reagent substance.

9. A method according to claim 8, wherein if a difference occurs between the first NOx concentration and the second NOx concentration the reagent substance dosage is reduced by the reagent substance signal.

10. A device to operate an internal combustion engine having an exhaust gas section with at least one SCR catalytic converter whose NOx conversion efficiency is regulated with a reagent substance, wherein provision is made for at least one control unit designed to implement a method including:
    calculating a first NOx concentration occurring downstream from a SCR catalytic converter;
    measuring a second NOx concentration occurring downstream from the SCR catalytic converter with a NOx sensor;
    determining a difference between the first NOx concentration and the second NOx concentration;
    measuring a temperature in the SCR catalytic converter;
    calculating a correction signal;
    calculating a reagent substance signal to regulate a reagent substance dosage,
    wherein the reagent substance dosage signal is a function of the correction signal.

11. A device according to claim 10, wherein the control unit contains a difference module, which ascertains a difference between an exhaust gas sensor signal provided by a $NO_x$ sensor having a cross sensitivity with regard to a reagent substance and a calculated $NO_x$ concentration downstream from a SCR catalytic converter.

12. A device according to claim 11, further comprising a control unit containing a characteristic diagram, wherein the characteristic diagram supplies a correction signal which is at least a function of a difference between a first NOx concentration and a second NOx concentration and a temperature in the SCR catalytic converter for the purpose of manipulating a reagent substance signal.

* * * * *

UNITED STATES PATENT AND TRADEMARK OFFICE
CERTIFICATE OF CORRECTION

PATENT NO.          : 8,020,374 B2                              Page 1 of 1
APPLICATION NO.     : 12/066231
DATED               : September 20, 2011
INVENTOR(S)         : Walz et al.

It is certified that error appears in the above-identified patent and that said Letters Patent is hereby corrected as shown below:

Col. 9, line 24, claim 2: "correction signals, wherein" should read --correction signal, wherein--

Signed and Sealed this
Fifth Day of June, 2012

David J. Kappos
*Director of the United States Patent and Trademark Office*